(12) United States Patent
Fujishiro

(10) Patent No.: US 9,705,572 B2
(45) Date of Patent: Jul. 11, 2017

(54) COMMUNICATION CONTROL METHOD AND BASE STATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/031,319

(22) PCT Filed: Oct. 27, 2014

(86) PCT No.: PCT/JP2014/078461
§ 371 (c)(1),
(2) Date: Apr. 22, 2016

(87) PCT Pub. No.: WO2015/064524
PCT Pub. Date: May 7, 2015

(65) Prior Publication Data
US 2016/0261315 A1   Sep. 8, 2016

(30) Foreign Application Priority Data

Oct. 29, 2013   (JP) ................................ 2013-224474

(51) Int. Cl.
*H04B 1/38* (2015.01)
*H04L 25/49* (2006.01)
(Continued)

(52) U.S. Cl.
CPC ........... *H04B 7/024* (2013.01); *H04B 7/0617* (2013.01); *H04B 7/0634* (2013.01);
(Continued)

(58) Field of Classification Search
USPC .......... 375/219, 220, 221, 222, 227, 240.26, 375/240.27, 284, 285, 295, 299, 316, 324,
(Continued)

(56) References Cited

U.S. PATENT DOCUMENTS

2009/0207822 A1* 8/2009 Kim ....................... H04B 7/026
370/338
2010/0002643 A1* 1/2010 Han ..................... H04B 7/0417
370/329

(Continued)

OTHER PUBLICATIONS

International Search Report issued in PCT/JP2014/078461; mailed Nov. 25, 2014.
(Continued)

*Primary Examiner* — Linda Wong
(74) *Attorney, Agent, or Firm* — Studebaker & Brackett PC

(57) ABSTRACT

A communication control method used in a mobile communication system in which a plurality of cells managed by different eNBs 200 cooperate with one another to perform communication with one UE 100. The communication method comprises the steps of: in a eNB 200-1 that manages a cell #1, receiving a BCI fed back from each of a plurality of UEs 100-1 connected with the cell #1; generating, on the basis of the received BCI, mapping information that includes a plurality of BCIs with which a frequency resource is associated respectively; and transmitting the mapping information to a eNB 200-2 that manages a cell #2.

6 Claims, 8 Drawing Sheets

(51) Int. Cl.
*H04L 27/00* (2006.01)
*H04B 7/024* (2017.01)
*H04W 16/28* (2009.01)
*H04B 7/06* (2006.01)
*H04W 72/04* (2009.01)
*H04W 92/20* (2009.01)
*H04W 84/04* (2009.01)

(52) U.S. Cl.
CPC .......... *H04B 7/0639* (2013.01); *H04W 16/28* (2013.01); *H04W 72/0446* (2013.01); *H04W 84/042* (2013.01); *H04W 92/20* (2013.01)

(58) Field of Classification Search
USPC .......................................... 375/345, 346, 347
See application file for complete search history.

(56) References Cited

U.S. PATENT DOCUMENTS

| | | | | |
|---|---|---|---|---|
| 2010/0151795 A1* | 6/2010 | Lee | .......... | H04B 7/066 455/69 |
| 2011/0013563 A1* | 1/2011 | Sivanesan | ............ | H04B 7/0417 370/328 |
| 2011/0281600 A1* | 11/2011 | Tanaka | ................... | H04B 7/024 455/500 |
| 2013/0058307 A1* | 3/2013 | Kim | ........................ | H04B 7/024 370/329 |
| 2013/0061299 A1* | 3/2013 | Novak | .................... | G06F 21/00 726/6 |
| 2013/0235842 A1* | 9/2013 | Jia | .......................... | H04B 7/024 370/330 |
| 2013/0279403 A1 | 10/2013 | Takaoka et al. | | |
| 2013/0343303 A1* | 12/2013 | Kim | ..................... | H04B 7/0452 370/329 |
| 2014/0177745 A1* | 6/2014 | Krishnamurthy | .... | H04B 7/0413 375/267 |
| 2015/0215018 A1* | 7/2015 | Xiong | ................... | H04W 24/10 370/329 |
| 2015/0333807 A1* | 11/2015 | Saiwai | ................ | H04B 7/0456 375/267 |
| 2016/0112167 A1* | 4/2016 | Xu | ........................ | H04L 5/005 370/329 |

OTHER PUBLICATIONS

Written Opinion issued in PCT/JP2014/078461; mailed Nov. 25, 2014.

3rd Generation Partnership Project; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013; pp. 1-209; 3GPP TS 36.300 V11.7.0; 3GPP Organizational Partners.

The extended European search report issued by the European Patent Office on May 11, 2017, which corresponds to European Patent Application No. 14859266.0-1874 and is related to U.S. Appl. No. 15/031,319.

* cited by examiner

FIG. 9

BCI INFO

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| BCI PER PRB | M | | BIT STRING (6..110, ...) | EACH POSITION IN THE BITMAP REPRESENTS A $n_{PRB}$ VALUE (I.E. FIRST BIT=PRB 0 AND SO ON), FOR WHICH THE BIT VALUE REPRESENTS CODEBOOK NUMBER DEFINED IN TS 36.21x. | — | — |
| PRIORITY PER PRB | O | | BIT STRING (6..110, ...) | EACH POSITION IN THE BITMAP REPRESENTS A $n_{PRB}$ VALUE (I.E. FIRST BIT=PRB 0 AND SO ON), FOR WHICH THE BIT VALUE REPRESENTS PRIORITY TO REQUEST NEIGHBOUR CELL. "1" MEANS "HIGH PRIORITY", "0" MEANS "LOW PRIORITY". | — | — |
| SUBFRAME | O | | INTEGER | SUBFRAME NUMBER THAT ABOVE INFORMATION IS AVAILABLE. | — | — |

FIG. 10

BCI INFO RESPONSE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| BCI ACCEPTANCE PER PRB | M | | BIT STRING (6..110, ....) | EACH POSITION IN THE BITMAP REPRESENTS A $n_{PRB}$ VALUE (I.E. FIRST BIT=PRB 0 AND SO ON), FOR WHICH THE BIT VALUE REPRESENTS ACCEPTED OR NOT-ACCEPTED. "1" MEANS ACCEPTED. "0" MEANS NOT-ACCEPTED. | – | – |
| SUBFRAME | O | | INTEGER | SUBFRAME NUMBER THAT ABOVE INFORMATION IS AVAILABLE. | – | – |

COMMUNICATION CONTROL METHOD AND BASE STATION

TECHNICAL FIELD

The present invention relates to a communication control method and a base station used in a mobile communication system.

BACKGROUND ART

In an LTE (Long Term Evolution) system of which the specifications are designed in 3GPP (3rd Generation Partnership Project) which is a project aiming to standardize a mobile communication system, CoMP (Coordinated Multi-Point) is specified in its Release 11 (see Non Patent Literature 1).

In the current specification, CoMP is assumed in which a plurality of cells managed by the same base station cooperate with one another to perform communication with one user terminal (that is, Intra-eNB CoMP).

Furthermore, as one scheme of the CoMP, CB (Coordinated Beamforming)-CoMP is discussed. The CB-CoMP represents a scheme in which a plurality of cells cooperate with one another to perform beamforming and null steering.

In the CB-CoMP, a base station that manages a plurality of cells receives a first precoder matrix indicator fed back from a first user terminal connected with a first cell and a second precoder matrix indicator fed back from a second user terminal connected with a second cell.

For example, the first precoder matrix indicator is an indicator for directing a null to the first user terminal, and is a BCI (Best Companion-Precoding Matrix Indicator) or a WCI (Worst Companion-Precoding Matrix Indicator). Furthermore, the second precoder matrix indicator is an indicator for directing a beam to the second user terminal, and is a PMI (Precoding Matrix Indicator).

Then, the base station allocates the same time-frequency resource as the time-frequency resource allocated to the first user terminal, to the second user terminal which feeds back the second precoder matrix indicator that matches the first precoder matrix indicator. Furthermore, the base station directs a null to the first user terminal and a beam to the second user terminal by applying the matched second precoder matrix indicator.

CITATION LIST

Non Patent Literature

[NPL 1] 3GPP Technical Specification "TS 36.300 V11.7.0" September, 2013

SUMMARY OF INVENTION

In the future, specifications of CoMP may be extended such that a plurality of cells managed by different base stations cooperate with one another to perform communication with one user terminal.

Thus, in such CoMP among different base stations (Inter-eNB CoMP), it is desirable to realize CB-CoMP.

Therefore, an object of the present invention is to realize the CB-CoMP in the CoMP among different base stations.

A communication control method according to a first aspect is used in a mobile communication system in which a plurality of cells managed by different base stations cooperate with one another to perform communication with one user terminal. The communication control method comprises the steps of: in a first base station that manages a first cell, receiving a first precoder matrix indicator fed back from each of a plurality of first user terminals connected with the first cell; generating, on the basis of the received first precoder matrix indicator, mapping information that includes a plurality of first precoder matrix indicators with which a frequency resource is associated respectively; and transmitting the mapping information to a second base station that manages a second cell.

A base station (first base station) according to a second aspect manages a first cell in a mobile communication system in which a plurality of cells managed by different base stations cooperate with one another to perform communication with one user terminal. The base station comprises a receiver configured to receive a first precoder matrix indicator fed back from each of a plurality of first user terminals connected with the first cell; a controller configured to generate, on the basis of the received first precoder matrix indicator, mapping information that includes a plurality of first precoder matrix indicators with which a frequency resource is associated respectively; and a transmitter configured to transmit the mapping information to a second base station that manages a second cell.

BRIEF DESCRIPTION OF DRAWINGS

FIG. 9 is a diagram showing a specific example of BCI information according to the embodiment.

FIG. 10 is a diagram showing a specific example of a BCI information response according to the embodiment.

DESCRIPTION OF EMBODIMENTS

Overview of Embodiments

Figure 1:
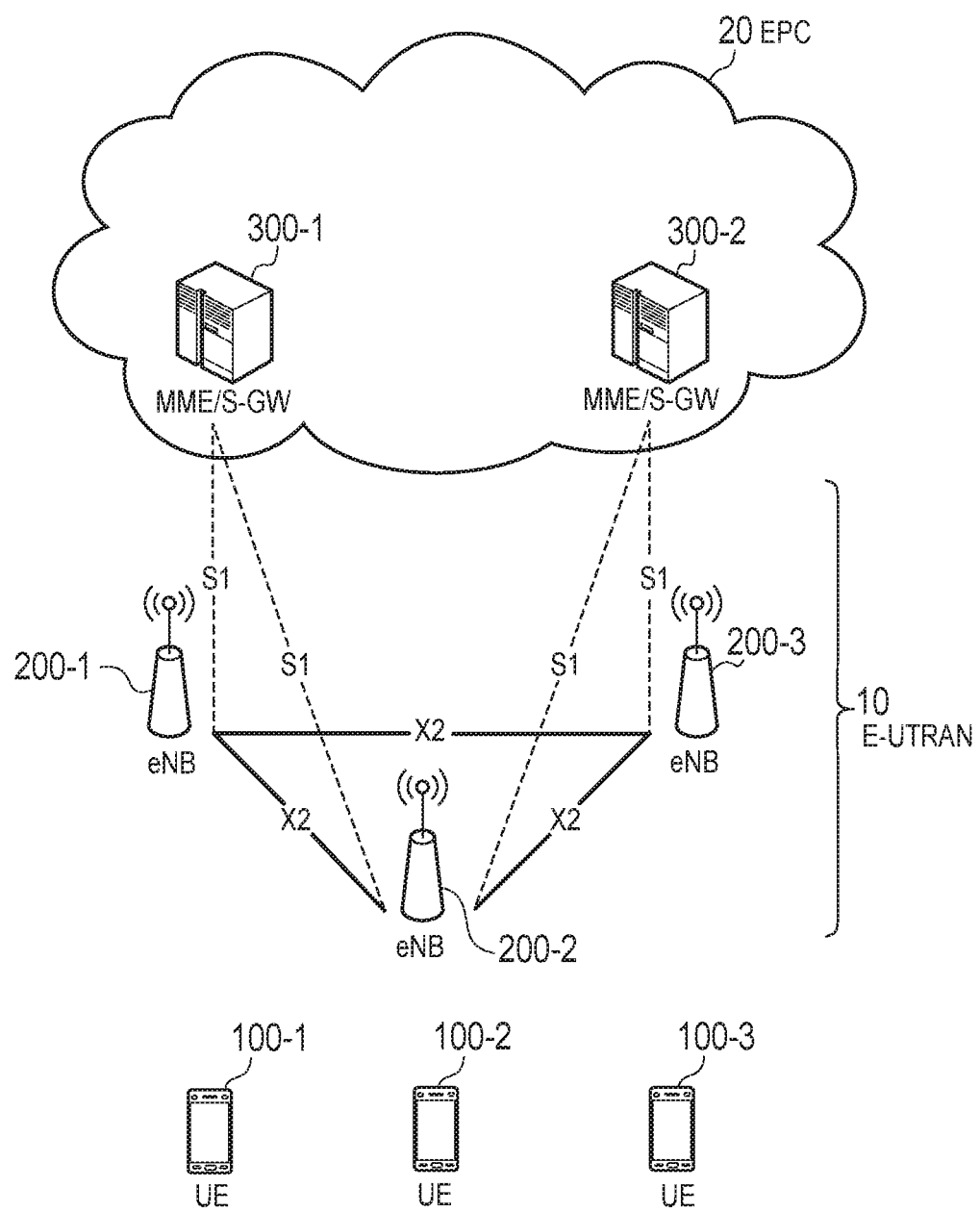
FIG. 1 is a configuration diagram of an LTE system according to an embodiment.

A communication control method according to embodiments is used in a mobile communication system in which a plurality of cells managed by different base stations cooperate with one another to perform communication with one user terminal. The communication control method comprises the steps of: in a first base station that manages a first cell, receiving a first precoder matrix indicator fed back from each of a plurality of first user terminals connected with the first cell; generating, on the basis of the received first precoder matrix indicator, mapping information that includes a plurality of first precoder matrix indicators with which a frequency resource is associated respectively; and transmitting the mapping information to a second base station that manages a second cell.

In the embodiments, the frequency resource is a resource block or a subband.

In the embodiments, the communication control method further comprises the steps of: in the second base station, receiving the mapping information; receiving a second precoder matrix indicator fed back from each of a plurality of second user terminals connected with the second cell; and identifying a second user terminal that feeds back a second precoder matrix indicator that matches any one of first precoder matrix indicators included in the mapping information.

In the embodiments, the communication control method further comprises the steps of: in the second base station, allocating, on the basis of the mapping information, a frequency resource associated with the any one of first precoder matrix indicators, to the identified second user terminal; and performing, to the identified second user terminal, downlink transmission by applying the matched second precoder matrix indicator.

In the embodiments, the first precoder matrix indicator is an indicator for directing a null to the first user terminal, and the second precoder matrix indicator is an indicator for directing a beam to the second user terminal.

In the embodiments, the communication control method further comprises the steps of: in the first base station, generating priority information that includes priority for each of the plurality of first precoder matrix indicators included in the mapping information; and transmitting the priority information to the second base station.

In the embodiments, the communication control method further comprises the steps of: in the first base station, generating validity period information indicating a period during which the mapping information to be applied; and transmitting the validity period information to the second base station.

A base station (first base station) according to the embodiments manages a first cell in a mobile communication system in which a plurality of cells managed by different base stations cooperate with one another to perform communication with one user terminal. The base station comprises a receiver configured to receive a first precoder matrix indicator fed back from each of a plurality of first user terminals connected with the first cell; a controller configured to generate, on the basis of the received first precoder matrix indicator, mapping information that includes a plurality of first precoder matrix indicators with which a frequency resource is associated respectively; and a transmitter configured to transmit the mapping information to a second base station that manages a second cell.

Embodiments

Embodiments of applying the present invention to the LTE system will be described below.

System Configuration

FIG. 1 is a configuration diagram of an LTE system according to a first embodiment. As illustrated in FIG. 1, the LTE system includes a plurality of UEs (User Equipments) 100, E-UTRAN (Evolved-Universal Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The network of the LTE system is constituted by the E-UTRAN 10 and the EPC 20. The EPC 20 includes a plurality of MME (Mobility Management Entity)/S-GWs (Serving-Gateways) 300. The MME performs various mobility controls and the like for the UE 100. The S-GW performs control to transfer user data. MME/S-GW 300 is connected to eNB 200 via an S1 interface.

Figure 2:
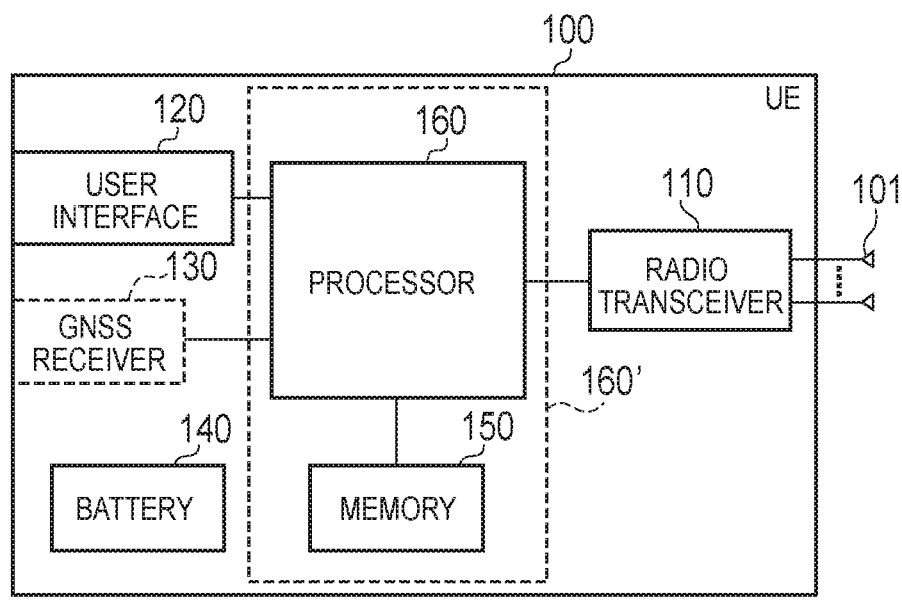
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage unit. The processor 160 and the memory 150 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
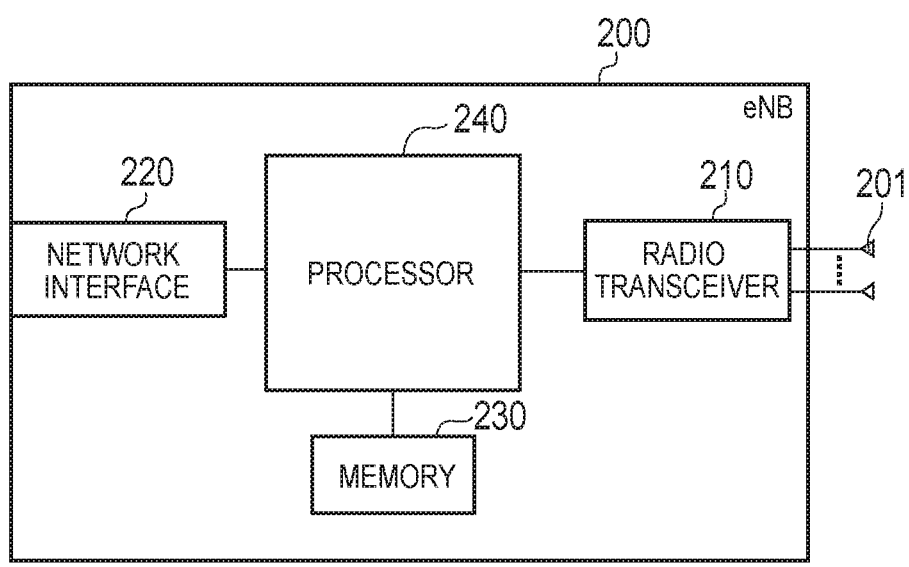
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
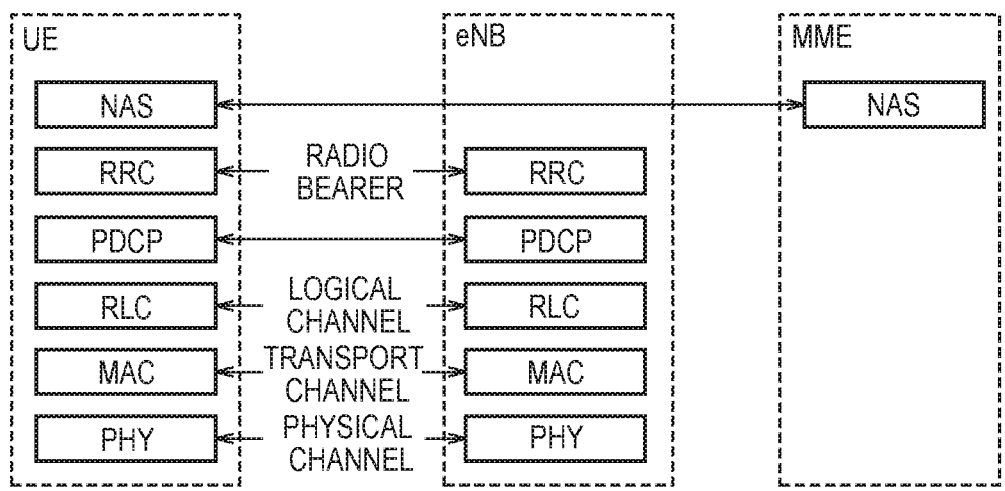
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer of the eNB 200 applies precoder matrix (transmission antenna weight) and rank (number of signal sequences) to perform downlink multi-antenna transmission. More information about downlink multi-antenna transmission according to the embodiments will be described later. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (RRC connected state), otherwise the UE 100 is in an idle state (RRC idle state).

A NAS (Non-Access Stratum) layer positioned above the RRC layer performs a session management, a mobility management and the like.

Figure 5:
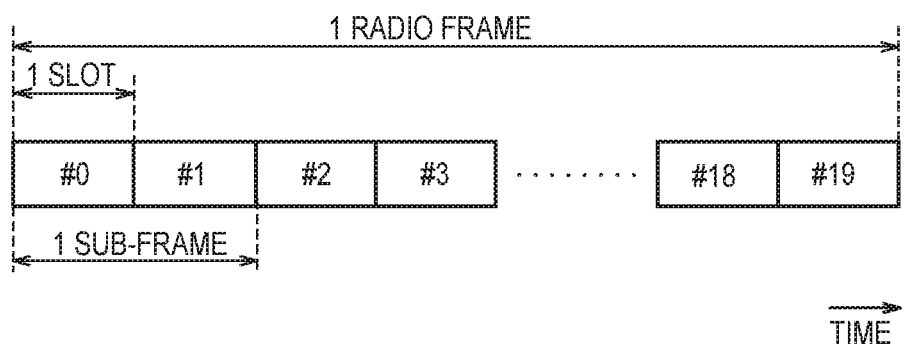
FIG. 5 is a configuration diagram of a radio frame according to the embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (PRB: Physical Resource Block) in a frequency direction, and a plurality of symbols in the time direction. The resource block includes a plurality of subcarriers in the frequency direction. Among radio resources (time-frequency resources) assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other portion of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. The remain portion of each subframe is a region available as a physical uplink shared channel (PUSCH) for mainly transmitting user data.

Overview of CB-CoMP

The LTE system according to the embodiment supports CB-CoMP. In the CB-CoMP, a plurality of eNBs 200 cooperate with one another to perform beamforming and null steering.

Figure 6:
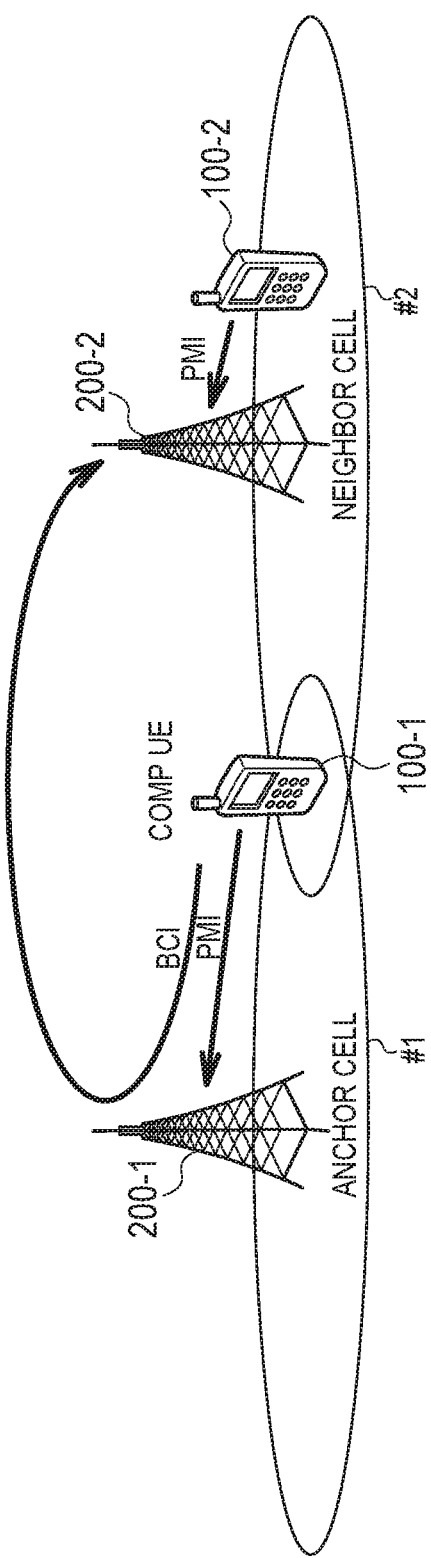
FIG. 6 is a diagram (part 1) for describing CB-CoMP according to the embodiment.
Figure 7:
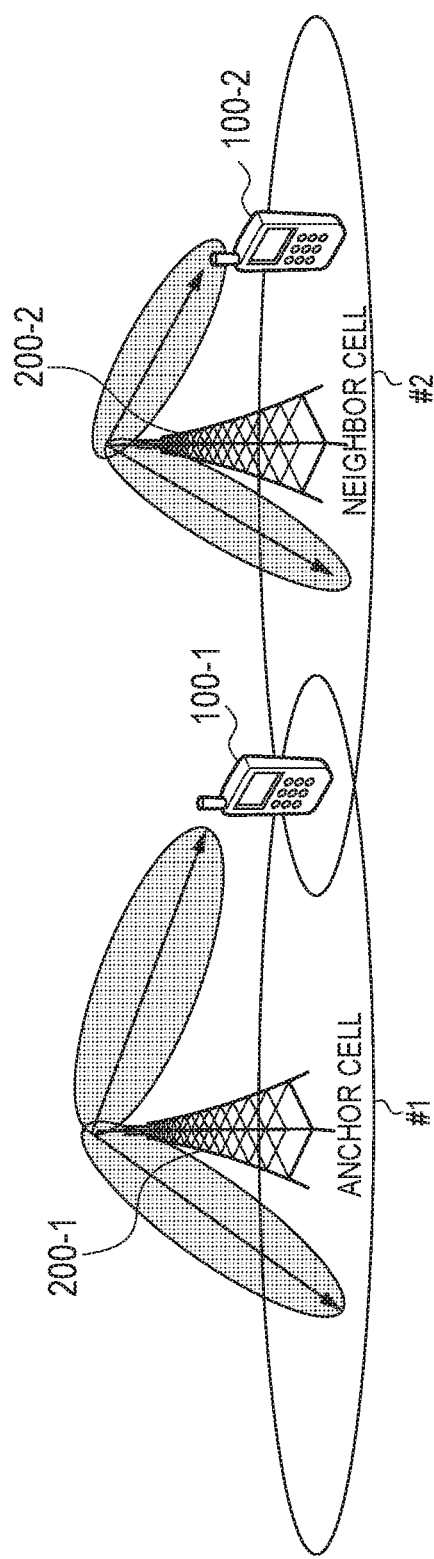
FIG. 7 is a diagram (part 2) for describing the CB-CoMP according to the embodiment.

FIG. 6 and FIG. 7 are diagrams for describing the CB-CoMP according to the embodiment. As shown in FIG. 6, each of an eNB 200-1 and an eNB 200-2 manages a cell. Furthermore, a cell #1 of the eNB 200-1 and a cell #2 of the eNB 200-2 belong to the same frequency.

A UE 100-1 is in a state of establishing connection with the cell #1 of the eNB 200-1 (in a connected state). That is, the UE 100-1 uses, as a serving cell, the cell #1 of the eNB 200-1 to perform communication. In FIG. 6, only one UE 100-1 is illustrated which establishes the connection with the cell #1 of the eNB 200-1; however, in a real environment, a plurality of UEs 100-1 establish connection with the cell #1 of the eNB 200-1.

On the other hand, a UE 100-2 is in a state of establishing connection with the cell #2 of the eNB 200-2 (in a connected state). That is, the UE 100-2 uses, as a serving cell, the cell #2 of the eNB 200-2 to perform communication. In FIG. 6, only one UE 100-2 is illustrated which establishes the connection with the cell #2 of the eNB 200-2; however, in a real environment, a plurality of UEs 100-2 establish connection with the cell #2 of the eNB 200-2.

The UE 100-1 shown in FIG. 6 is located at a boundary area of the cell #1 of the eNB 200-1 and the cell #2 of the eNB 200-2. In this case, the UE 100-1 is influenced by interference from the cell #2 of the eNB 200-2. Here, when the CB-CoMP is applied to the UE 100-1, it is possible to suppress the interference received in the UE 100-1.

An operation overview when the CB-CoMP is applied to the UE 100-1 will be described, below. It is noted that the UE 100-1 to which the CB-CoMP is applied may be called a "CoMP UE." The serving cell of the UE 100-1 (CoMP UE) may be called an "anchor cell."

Each of the UE 100-1 and the UE 100-2 feeds beamforming control information for directing a beam to the UE 100-1 and the UE 100-2, back to the serving cell, on the basis of a reference signal received from the serving cell, for example. In the embodiment, the beamforming control information includes a precoder matrix indicator (PMI). The beamforming control information may further include a rank indicator (RI). The PMI is an indicator indicating a precoder matrix (transmission antenna weight) recommended to the serving cell. The RI is an indicator indicating a rank (signal sequence number) recommended to the serving cell. Each of the UE 100-1 and the UE 100-2, which holds a table (code book) in which the precoder matrix and its indicator are associated, selects a precoder matrix that improves communication quality of a desired wave, and feeds back, as the PMI, the indicator corresponding to the selected precoder matrix.

The UE 100-1 further feeds null-steering control information for directing a null to the UE 100-1, back to the serving cell (cell #1), on the basis of a reference signal received from a neighboring cell (cell #2), for example. In the embodiment, the null-steering control information includes a BCI (Best Companion PMI). The null-steering control information may further include the RI. The BCI is an indicator indicating a precoder matrix (transmission antenna weight) recommended to the neighboring cell (cell #2). The UE 100-1, which holds a table (code book) in which the precoder matrix and its indicator are associated, selects a precoder matrix that reduces a reception level of an interference wave or reduces influence to a desired wave, and feeds back, as the BCI, the indicator corresponding to the selected precoder matrix.

The eNB 200-1 transfers the null-steering control information (BCI) fed back from the UE 100-1, to the eNB 200-2. Details will be described later; however, the eNB 200-1 generates mapping information that includes the null-steering control information (BCI) fed back from the UE 100-1, and transmits the mapping information to the eNB 200-2.

The eNB 200-2 receives the beamforming control information (PMI) fed back from each of the plurality of UEs 100-2 connected with a cell of the eNB 200-2 (cell #2) and the null-steering control information (BCI) fed back from the UE 100-1 connected with the neighboring cell (cell #1). Then, the eNB 200-2 selects the UE 100-2 that feeds back the beamforming control information that matches the null-steering control information, as a pair UE (pair terminal) that forms a pair with the UE 100-1. In the embodiment, "the beamforming control information that matches the null-steering control information" is the PMI that coincides with the BCI.

When selecting the pair UE (UE 100-2), the eNB 200-2 allocates the same time-frequency resource as the time-frequency resource allocated to the UE 100-1, to the pair UE. Then, the eNB 200-2 applies the beamforming control information (PMI) fed back from the pair UE to perform transmission to the pair UE. Consequently, as shown in FIG. 7, the eNB 200-2 is capable of performing transmission to the pair UE by directing a null to the UE 100-1 while directing a beam to the pair UE.

Communication Control Method According to Embodiment

In the above-described Inter-eNB CB-CoMP, contents of information exchanged among eNBs 200 is important.

Figure 8:
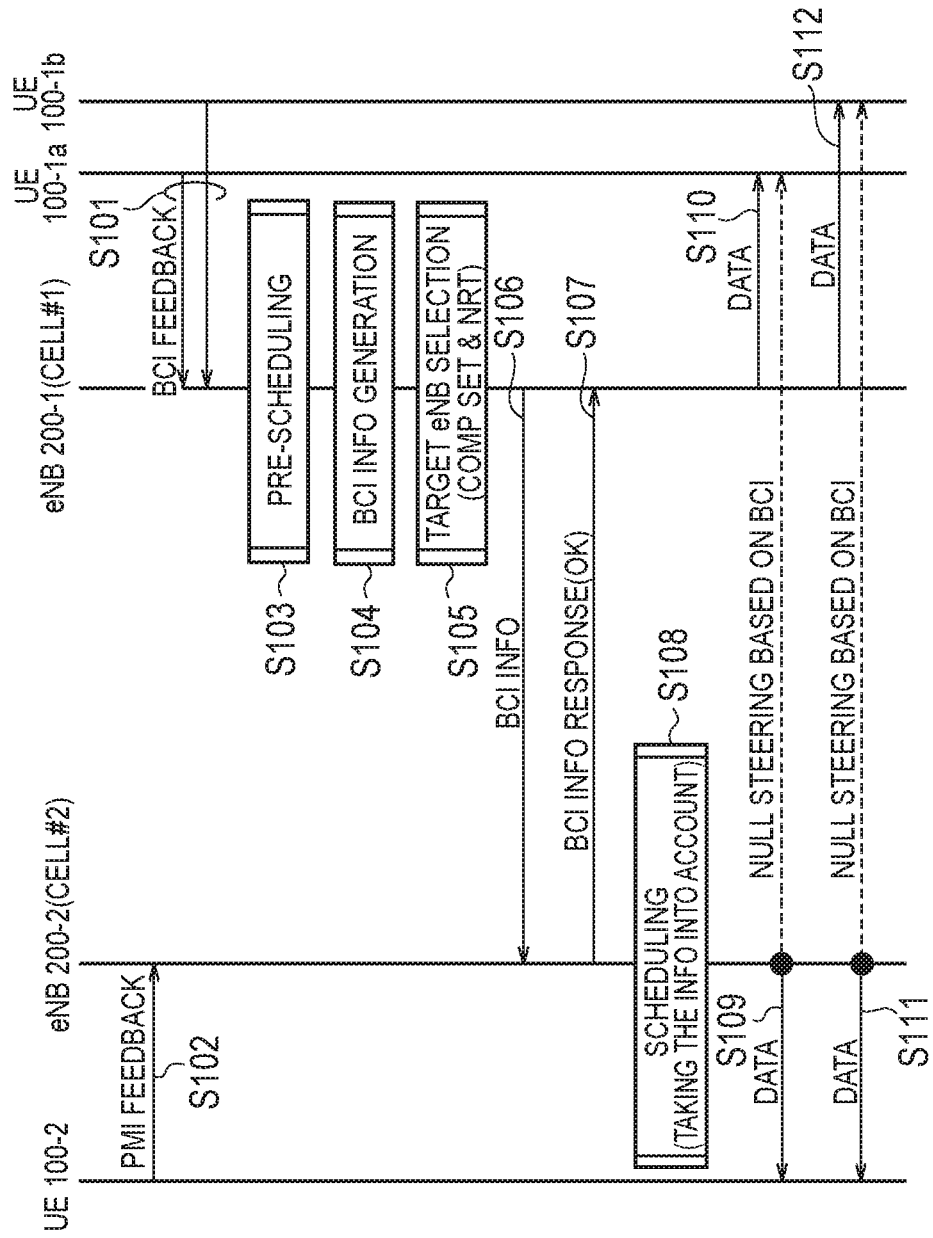
FIG. 8 is a sequence diagram showing a communication control method according to the embodiment.

FIG. 8 is a sequence diagram showing a communication control method according to the embodiment. The communication control method according to the embodiment is used in a mobile communication system that supports the Inter-eNB CB-CoMP.

As shown in FIG. 8, in step S101, the eNB 200-1 that manages the cell #1 receives the BCI fed back from each of the plurality of UEs 100-1 (a UE 100-1a and 100-1b) connected with the cell #1. The BCI corresponds to a first precoder matrix indicator for directing a null to the UE 100-1. The UE 100-1 feeds back the BCI for each subband, for example. The subband is a frequency unit including a plurality of resource blocks.

In step S102, the eNB 200-2 that manages the cell #2 receives the PMI fed back from each of the plurality of UEs 100-2 connected with the cell #2. The PMI corresponds to a second precoder matrix indicator for directing a beam to the UE 100-2. The UE 100-2 feeds back the PMI for each subband, for example.

In step S103, the eNB 200-1 performs pre-scheduling for the UE 100-1. For the pre-scheduling, channel state information (CSI) that is separately fed back from the UE 100-1, is used. The eNB 200-1 decides a resource block to be allocated to the UE 100-1 by pre-scheduling.

In step S104, the eNB 200-1 generates, on the basis of the BCI received from the UE 100-1, the mapping information that includes a plurality of BCIs with which a frequency resource is associated respectively. A frequency resource associated with each of the plurality of BCIs in the mapping information is a resource block or a subband. For example, the eNB 200-1 identifies a subband to which a resource block allocated to the UE 100-1 belongs, and associates the BCI fed back from the UE 100-1 for the subband with the resource block, then includes the same in the mapping information. Alternatively, the eNB 200-1 may identify a subband to which a resource block allocated to the UE 100-1 belongs, and associate the BCI fed back from the UE 100-1 for the subband with the subband, then include the same in the mapping information.

Further, the eNB 200-1 may generate priority information that includes priority for each of the plurality of BCIs included in the mapping information. The eNB 200-1 may generate validity period information indicating a period during which the mapping information to be applied. It is noted that specific examples of the mapping information, the priority information, and the validity period information will be described later. Hereinafter, the mapping information, the priority information, and the validity period information are called "BCI information (BCI info)," where appropriate.

In step S105, the eNB 200-1 identifies a transmission target of the BCI information, on the basis of a neighboring cell list held by the eNB 200-1. The transmission target of the BCI information is the eNB 200-2 (cell #2).

In step S106, the eNB 200-1 transmits the BCI information to the eNB 200-2. The eNB 200-2 receives the BCI information from the eNB 200-1.

In step S107, the eNB 200-2 transmits, to the eNB 200-1, a BCI information response (BCI info response) that is a response to the BCI information. The BCI information response may be an acknowledgment (OK) or a negative acknowledgment (NG). However, the BCI information response is not essential and the eNB 200-2 may not transmit the BCI information response to the eNB 200-1. A specific example of the BCI information response will be described later.

In step S108, the eNB 200-2 performs scheduling for the UE 100-2, on the basis of the PMI received from the UE 100-2 and the BCI information received from the eNB 200-1. Specifically, the eNB 200-2 identifies the UE 100-2 (that is, pair UE) that feeds back the PMI that matches any one of the BCIs included in the mapping information. Hereinafter, the PMI that matches the BCI is called "matched PMI" and the BCI that matches the PMI is called "matched BCI." Then, the eNB 200-2 allocates, on the basis of the mapping information, a frequency resource (resource block) associated with the matched BCI to the identified UE 100-2 (pair UE). As a result, it is possible to allocate, to the UE 100-2 (pair UE), the same resource block as a resource block allocated to the UE 100-1.

In steps S109 and S111, the eNB 200-2 performs downlink transmission by applying the matched PMI (or matched BCI), to the UE 100-2 (pair UE). As a result, it is possible to transmit data to the UE 100-2 (pair UE) in a directional pattern in which a beam is directed to the UE 100-2 (pair UE) and a null is directed to the UE 100-1. In this way, the downlink interference from the eNB 200-2 is suppressed in the downlink transmission from the eNB 200-1 to the UE 100-1 (step S110, step S112).

Next, a specific example of the BCI information (mapping information, priority information, validity period information) will be described. FIG. 9 is a diagram showing a specific example of the BCI information.

As shown in FIG. 9, the BCI information includes the mapping information (BCI Per PRB), the priority information (Priority Per PRB), and the validity period information (Subframe). However, the priority information and the validity period information may not be necessarily included in the BCI information.

The mapping information is information in which the BCI and a resource block are associated. In the mapping information, a field for each resource block is predetermined, and the BCI is stored in the field. For example, when the BCI has six types from "0" to "5," each one field has the bit length of 3 bits. The eNB 200-2 that receives the mapping information is capable of identifying a resource block corresponding to the BCI, on the basis of a position of a field to which the BCI is stored.

The priority information is information in which priority of the BCI and a resource block are associated. For example, the eNB 200-1 sets the priority high for the BCI fed back by the UE 100-1 that has higher necessity of suppressing the interference. The necessity of suppressing the interference can be determined by a CQI (Channel Quality Indicator) fed back from the UE 100-1. The CQI is a type of the CSI. In the priority information, a bit for each resource block is predetermined, and for example, "1" is set to high priority and "0" is set to low priority. The eNB 200-2 that receives the priority information is capable of identifying the priority of the BCI, on the basis of a position of a bit indicating the priority of the BCI. Alternatively, the priority may have three levels or more (for example, high, middle, low).

The validity period information is information indicating a validity period (subframe number, etc.) during which the mapping information and the priority information are effective. The eNB 200-1 sets, as the validity period, a period during which the above-described pre-scheduling to be performed. When regulating the validity period by a subframe range, the validity period information may include a start subframe number and an end subframe number.

Next, a specific example of the BCI information response will be described. FIG. 10 is a diagram showing a specific example of the BCI information response.

As shown in FIG. 10, the BCI information response includes response information indicating acceptance or refusal for each BCI included in the mapping information and the validity period information indicating the validity period during which the response information is effective. However, the validity period information may not be necessarily included in the BCI information response. The response information is information in which OK/NG whether to accept the BCI and a resource block are associated. For example, in the response information, a bit for each resource block is predetermined, and for example, "1" is set when OK to accept and "0" is set when NG to accept. The eNB 200-2 that receives the response information is capable of identifying OK/NG whether to accept the BCI, on the basis of a position of a bit indicating OK/NG whether to accept the BCI.

SUMMARY OF EMBODIMENT

As described above, the communication control method according to the embodiment comprises the steps of: receiving, in the eNB 200-1 that manages the cell #1, the BCI fed back from each of the plurality of UEs 100-1 connected with the cell #1; generating, on the basis of the received BCI, the mapping information that includes the plurality of BCIs associated with a frequency resource respectively; and transmitting the mapping information to the eNB 200-2 that manages the cell #2. As a result, the eNB 200-2 that receives the mapping information is capable of recognizing, on the basis of the mapping information, correspondence relationship between the BCI and the frequency resource to perform appropriate scheduling for the UE 100-2 connected with the cell #2. Thus, it is possible to realize the CB-CoMP in the Inter-eNB CoMP.

Other Embodiments

In the above-described embodiment, the BCI information is assumed to include information for each resource block of an entire downlink band (downlink carrier). However, the downlink band may be divided into a plurality, and then the BCI information may be generated and transmitted individually for each divided frequency band.

In the above-described embodiment, the BCI is described as an example of the null-steering control information; however, a WCI (Worst Companion PMI) may be used instead of the BCI. The WCI is an indicator indicating a precoder matrix in which an interference level from an interference source is high. In this case, the eNB 200-2 receives the beamforming control information (PMI) fed back from the UE 100-2 and the null-steering control information (WCI) fed back from the UE 100-1. Then, the eNB 200-2 selects the UE 100-2 that feeds back the beamforming control information that matches the null-steering control information, as a pair UE (pair terminal) that forms a pair with the UE 100-1. In this case, "the beamforming control information that matches the null-steering control information" is the PMI that does not coincide with the WCI.

In the above-described embodiment, an example is described such that in the CB-CoMP, the UE 100-1 connected with the cell #1 feeds back the BCI and the UE 100-2 connected with the cell #2 feeds back the PMI. However, the UE 100-1 connected with the cell #1 may feed back the PMI and the UE 100-2 connected with the cell #2 may feed back the BCI. That is, "BCI" may be regarded as "PMI" in the above-described operation sequence, as well as "PMI" may be regarded as "BCI." In this case, the PMI corresponds to the first precoder matrix indicator and the BCI corresponds to the second precoder matrix indicator.

In the above-described embodiment, an example of applying the present invention to the mobile communication system that supports the CB-CoMP is described; however, in addition to the CB-CoMP, the present invention may be applied to a mobile communication system that supports dual connectivity. The dual connectivity is a scheme in which one UE 100 establishes connection with a plurality of eNBs 200.

Further, in addition to the CB-CoMP and the dual connectivity, the present invention may be applied to a mobile communication system that supports D2D (Device to Device) communication. The D2D communication is a scheme in which a plurality of neighboring UEs 100 perform direct communication without passing through a network. In the D2D communication, in a group (cluster) including a plurality of UEs 100, there is a UE 100 (cluster head) that controls the D2D communication. When applying the above-described CB-CoMP to interference control among clusters, a first cluster head within a first cluster receives a precoder matrix indicator from the UE 100. Then, the above-described mapping information etc. may be transmitted from the first cluster head to a second cluster head within a second cluster.

In the above-described embodiment, as an example of cellular communication system, the LTE system is described; however, the present invention is not limited to the LTE system, and the present invention may be applied to systems other than the LTE system.

It is noted that the entire content of Japanese Patent Application No. 2013-224474 (filed on Oct. 29, 2013) is incorporated in the present specification by reference.

INDUSTRIAL APPLICABILITY

According to the present invention, it is possible to realize CB-CoMP in CoMP among different base stations.

The invention claimed is:

1. A communication control method used in a mobile communication system in which a plurality of cells managed by different base stations cooperate with one another to perform communication with one user terminal, comprising the steps of:
   in a first base station that manages a first cell,
   receiving a first precoder matrix indicator fed back from each of a plurality of first user terminals connected with the first cell, wherein the first precoder matrix indicator is an indicator to be used by the first base station and causes the first base station to direct a beam to the corresponding first user terminal;
   generating, on the basis of the received first precoder matrix indicator, mapping information that includes a plurality of first precoder matrix indicators with which a frequency resource is associated respectively;
   transmitting the mapping information to a second base station that manages a second cell;
   generating validity period information indicating a period during which the mapping information to be applied; and
   transmitting the validity period information to the second base station.

2. The communication control method according to claim 1, wherein the frequency resource is a resource block or a subband.

3. The communication control method according to claim 1, further comprising the steps of:
   in the second base station,
   receiving the mapping information;
   receiving a second precoder matrix indicator fed back from each of a plurality of second user terminals connected with the second cell; and
   identifying a second user terminal that feeds back a second precoder matrix indicator that matches any one of first precoder matrix indicators included in the mapping information.

4. The communication control method according to claim 3, further comprising the steps of:
   in the second base station,
   allocating, on the basis of the mapping information, a frequency resource associated with the any one of first precoder matrix indicators, to the identified second user terminal; and
   performing, to the identified second user terminal, downlink transmission by applying the matched second precoder matrix indicator.

5. A communication control method used in a mobile communication system in which a plurality of cells managed by different base stations cooperate with one another to perform communication with one user terminal, comprising the steps of:
   in a first base station that manages a first cell,
   receiving a first precoder matrix indicator fed back from each of a plurality of first user terminals connected with the first cell, wherein the first precoder matrix indicator is an indicator to be used by the first base station and causes the first base station to direct a beam to the corresponding first user terminal;
   generating, on the basis of the received first precoder matrix indicator, mapping information that includes a plurality of first precoder matrix indicators with which a frequency resource is associated respectively;
   transmitting the mapping information to a second base station that manages a second cell;
   generating priority information that includes priority for each of the plurality of first precoder matrix indicators included in the mapping information; and
   transmitting the priority information to the second base station.

6. A first base station that manages a first cell in a mobile communication system in which a plurality of cells managed by different base stations cooperate with one another to perform communication with one user terminal, comprising:
   a receiver configured to receive a first precoder matrix indicator fed back from each of a plurality of first user terminals connected with the first cell, wherein the first precoder matrix indicator is an indicator to be used by the first base station and causes the first base station to direct a beam to the corresponding first user terminal;
   a controller configured to generate, on the basis of the received first precoder matrix indicator, mapping information that includes a plurality of first precoder matrix indicators with which a frequency resource is associated respectively; and
a transmitter configured to transmit the mapping information to a second base station that manages a second cell, wherein
   the controller is further configured to generate validity period information indicating a period during which the mapping applied; and the transmitter is further configured to transmit the validity period information to the second base station.

\* \* \* \* \*